(12) United States Patent
Bowman et al.

(10) Patent No.: US 6,169,986 B1
(45) Date of Patent: *Jan. 2, 2001

(54) SYSTEM AND METHOD FOR REFINING SEARCH QUERIES

(75) Inventors: Dwayne E. Bowman, Woodinville; Ruben E. Ortega; Michael L. Hamrick, both of Seattle; Joel R. Spiegel, Woodinville; Timothy R. Kohn, Seattle, all of WA (US)

(73) Assignee: Amazon.com, Inc., Seattle, WA (US)

( * ) Notice: Under 35 U.S.C. 154(b), the term of this patent shall be extended for 0 days.

This patent is subject to a terminal disclaimer.

(21) Appl. No.: 09/411,441

(22) Filed: Oct. 1, 1999

Related U.S. Application Data (63) Continuation of application No. 09/145,360, filed on Sep. 1, 1998, now Pat. No. 6,006,225.

(60) Provisional application No. 60/089,244, filed on Jun. 15, 1998.

(51) Int. Cl.$^7$ .................................................. G06F 17/30
(52) U.S. Cl. ........................ 707/5; 707/2; 707/4; 707/10
(58) Field of Search ................... 707/5, 2, 10, 4

(56) References Cited

U.S. PATENT DOCUMENTS

| | | | |
|---|---|---|---|
| 5,675,819 | * 10/1997 | Schuetze | 704/10 |
| 5,721,897 | * 2/1998 | Rubinstein | 707/2 |
| 5,787,422 | * 7/1998 | Tukey et al. | 707/5 |
| 5,794,233 | * 8/1998 | Rubinstein | 707/4 |
| 5,864,845 | 1/1999 | Voorhees et al. | |
| 5,865,845 | * 1/1999 | Voorhees et al. | 7074/5 |
| 5,911,140 | * 6/1999 | Tukey et al. | 707/5 |
| 5,913,215 | * 6/1999 | Rubinstein | 707/10 |
| 6,006,225 | * 12/1999 | Bowman et al. | 707/5 |

OTHER PUBLICATIONS

Abstract of *Generating Advanced Query Interfaces*, Lee, Srivastava and Vista, Computer Networks and ISDN System Conference Title: Comput. Netw. ISDN Syst. (Netherlands) vol. 30, No. 1–7, pp. 656–657 (1998).

Abstract of *Using Combination of Evidence for Term Expansion*, Wilkinson, Information Retrieval Research, Proceedings of the 19$^{th}$ Annual BCS–IRSG Colloquium on IR Research (1997).

Abstract of *Inquirus, the NECI Meta Search Engine*, Lawrence and Giles, Computer Networks and ISDN Systems Conference Title: Comput. Netw. ISDN Syst. (Netherlands) vol. 30, No. 1–7, pp. 95–105 (1998).

Abstract of *Facilitating Complex Web Queries Through Visual User Interfaces and Query Relaxation*, Li and Shim, Computer Networks and ISDN Systems Conference Title: Comput. Netw. ISDN Syst. (Netherlands) vol. 30, No. 1–7, pp. 149–159 (1998).

(List continued on next page.)

*Primary Examiner*—Thomas G. Black
*Assistant Examiner*—Frantz Coby
(74) *Attorney, Agent, or Firm*—Knobbe, Martens, Olson & Bear, LLP (57) ABSTRACT

A search engine is disclosed which suggests related terms to the user to allow the user to refine a search. The related terms are generated using query term correlation data which reflects the frequencies with which specific terms have previously appeared within the same query. The correlation data is generated and stored in a look-up table using an off-line process which parses a query log file. The table is regenerated periodically from the most recent query submissions (e.g., the last two weeks of query submissions), and thus strongly reflects the current preferences of users. Each related term is presented to the user via a respective hyperlink which can be selected by the user to submit a modified query. In one embodiment, the related terms are added to and selected from the table so as to guarantee that the modified queries will not produce a NULL query result.

12 Claims, 10 Drawing Sheets

OTHER PUBLICATIONS

*A User–centred Evaluation of Ranking Algorithms for Interactive Query Expansion*, Efthimiadis, Proceedings of the 16th Annual International ACM SIGIR Conference, Pittsburgh, pp. 146–159 (1993).

*Concept Based Query Expansion*, Qiu and Frei, Proceedings of the 16th Annual International ACM SIGIR Conference, Pittsburgh, pp. 160–169 (1993).

Improving Retrieval Performance by Relevance Feedback, Salton and Buckley, J. of Am. Society for Info. Science 41(4):288–297 (1990).

Query Expansion Using Domain–Adapted, *Weighted Thesaurus in an Extended Boolean Model*, Kwon, Kim and Choi, Proceedings of the 3rd International Conference on Information and Knowledge Management (CIKM'94), pp. 140–146 (1994).

*Browsing Through Querying: Designing for Electronic Books*, Charoenkitkarn, Tam, Chignell and Golovchinsky, at the 5th ACM Conference on Hypertext, Seattle, WA 206–216 (1993).

*A Survey of Information Retrieval and Filtering Methods*, Faloutsos and Oard, Univ. of Maryland, 22 pages (undated).

*A Corpus Analysis Approach for Automatic Query Expansion*, Gauch and Wang, Proceedings of the 6th International Conference on Information and Knowledge Management, pp. 278–284 (1997).

*Discovering Web Access Patterns and Trends by Applying OLAP and Data Mining Technology on Web Logs*, Zaiane, Xin and Han, Proceedings of the IEEE Forum on Research and Technology Advances in Digital Libraries (IEEE ADL'98), pp. 19–29 (1998).

Bartell et al., "Automatic Combination of Multiple Ranked Retrieval Systems", Proceedings of SIGIR'94, Jul. 1994, pp. 173–181, Jul. 1994.

Belkin et al., "The Effect of Multiple Query Representations on Information System Performance" Proceedings of SIGIR'93, Jun. 1993, pp. 339–346, Jun. 1993.

Shaw et al., "Combination of Multiple Searches", Proceedings of TREC–3, Apr. 1995, pp. 105–108, Apr. 1995.

QuarterDeck Web Page, Downloaded Sep. 9, 1996, http://aracnid.qdeck.com/qdeck/products/webcompass, Sep. 1996.

Towell, et al. "Learning Collection Fusion Strategies for Information Retrieval", Proceedings of the 12th Annual Machine Learning Conference, pp. 540–548, Jul. 1995.

Voohees, et al., "Learning Collection Fusion Strategies", Proceedings of SIGIR'95, pp. 172–179, Jul. 1995.

Voorhees, et al., "The Collection Fusion Problem" Proceedings of TREC–3, NIST Special Publication 500–225, pp. 95–104, Apr. 1995.

\* cited by examiner

File  Edit  View  Go  Favorite  Help

Back  Forw...  Stop  Refresh  Home  Search  Favorite  Print  Font  Mail

Address  http://www.amazon.com/book_search amazon.com  Book Search

Enter Author and/or Title

Author: [__________] 210
● Exact Name   ○ Last, First Name   ○ Start of Last Name Title: [__________] 220
○ Exact Title   ● Title Word(s)   ○ Start(s) of Title Words

[Search Now]  [Clear the Form]
230
Author Search Tips / Title Search Tips

---

Search by Subject

Subject: [__________] 240
○ Exact Subject   ○ Start of Subject   ● Subject Word(s)   ○ Start(s) of Subject Word(s)

[Search Now]  [Clear the Form]
250
Subject Search Tips

---

Other Search Methods:
ISBN, Publisher/Date, Quick Search

Amazon.com Home | Music Search | Your Account

FIG.2

310 — 
Friday, 13-Feb-98 02:23:52
User Identifier = 29384719287
HTTP_REFERRER= http://www.amazon.com/book_search_page
PATH_INFO=/book_search
title = Snow Crash
items_found = 2

320 — 
Friday, 13-Feb-98 02:24:11
User Identifier = 29384719287
HTTP_REFERRER= http://www.amazon.com/book_search
PATH_INFO=/ISBN = 0553562614

330 — 
Friday, 13-Feb-98 06:15:03
User Identifier = 54730543261
HTTP_REFERRER= http://www.amazon.com/music_search_page
PATH_INFO=/music_search
artist = This and That
items_found = 0

340 — 
Friday, 13-Feb-98 10:07:34
User Identifier = 027385918272
HTTP_REFERRER= http://www.amazon.com/book_search_page
PATH_INFO=/book_search
subject = outdoor trail
items_found = 22

| S-BIKE | S-OUTDOOR | S-TRAIL | ... |
|---|---|---|---|
| A-CARLSON (2)<br>S-EXCERCISE (12)<br>A-FRANKLIN (5)<br>T-HUFFY (34)<br>S-OUTDOOR (65)<br>T-REPAIR (54)<br>S-TRAIL (41)<br>T-TRAIL (14)<br>A-YATES (8)<br>... | T-BIKE (73)<br>T-DINING (100)<br>T-EDUCATION (36)<br>S-SPORTS (41)<br>S-TRAIL (65)<br>T-TRAIL (7)<br>S-VACATION (23)<br>A-WAGNER (10)<br>... | S-BLAZING (35)<br>T-BLAZING (5)<br>S-BIKE (63)<br>A-GARRETT (21)<br>S-MIX (92)<br>S-OUTDOOR (23)<br>S-SPORTS (12)<br>S-VACATION (9)<br>T-YUKON (76)<br>... | ... |

Top 3 Related Terms:

TRAIL — MIX
TRAIL — YUKON      810
TRAIL — BIKE

FIG. 8A

Intersecting Terms:

S — BIKE
S — SPORTS      820
S — VACATION

830   Top 3 Related Terms:

OUTDOOR TRAIL — BIKE
OUTDOOR TRAIL — SPORTS
OUTDOOR TRAIL — VACATION

SYSTEM AND METHOD FOR REFINING SEARCH QUERIES

RELATED APPLICATION

This application is a continuation of application Ser. No. 09/145,360 filed Sep. 1, 1998 now U.S. Pat. No. 6,006,225 claims the benefit of U.S. Provisional Application Ser. No. 60/089,244, filed Jun. 15, 1998, the disclosure of which is hereby incorporated by reference.

BACKGROUND OF THE INVENTION

1. Field of Invention

This present invention relates to query processing, and more specifically relates to techniques for facilitating the process of refining search queries.

2. Description of Related Art

With the increasing popularity of the Internet and the World Wide Web, it is common for on-line users to utilize search engines to search the Internet for desired information. Many web sites permit users to perform searches to identify a small number of relevant items among a much larger domain of items. As an example, several web index sites permit users to search for particular web sites among known web sites. Similarly, many on-line merchants, such as booksellers, permit users to search for particular products among all of the products that can be purchased from the merchant. Other on-line services, such as Lexis™ and Westlaw™, allow users to search for various articles and court opinions.

In order to perform a search, a user submits a query containing one or more query terms. The query may also explicitly or implicitly identify a record field or segment to be searched, such as title, author, or subject classification of the item. For example, a user of an on-line bookstore may submit a query containing terms that the user believes appear within the title of a book. A query server program of the search engine processes the query to identify any items that match the terms of the query. The set of items identified by the query server program is referred to as a "query result." In the on-line bookstore example, the query result is a set of books whose titles contain some or all of the query terms. In the web index site example, the query result is a set of web sites or documents. In web-based implementations, the query result is typically presented to the user as a hypertextual listing of the located items.

If the scope of the search is large, the query result may contain hundreds, thousands or even millions of items. If the user is performing the search in order to find a single item or a small set of items, conventional approaches to ordering the items within the query result often fail to place the sought item or items near the top of the query result list. This requires the user to read through many other items in the query result before reaching the sought item. Certain search engines, such as Excite™ and AltaVista™, suggest related query terms to the user as a part of the "search refinement" process. This allows the user to further refine the query and narrow the query result by selecting one or more related query terms that more accurately reflect the user's intended request. The related query terms are typically generated by the search engine using the contents of the query result, such as by identifying the most frequently used terms within the located documents. For example, if a user were to submit a query on the term "FOOD," the user may receive several thousand items in the query result. The search engine might then trace through the contents of some or all of these items and present the user with related query terms such as "RESTAURANTS," "RECIPIES," and "FDA" to allow the user to refine the query.

The related query terms are commonly presented to the user together with corresponding check boxes that can be selectively marked or checked by the user to add terms to the query. In some implementations, the related query terms are alternatively presented to and selected by the user through drop down menus that are provided on the query result page. In either case, the user can add additional terms to the query and then re-submit the modified query. Using this technique, the user can narrow the query result down to a more manageable set consisting primarily of relevant items.

One problem with existing techniques for generating related query terms is that the related terms are frequently of little or no value to the search refinement process. Another problem is that the addition of one or more related terms to the query sometimes leads to a NULL query result. Another problem is that the process of parsing the query result items to identify frequently used terms consumes significant processor resources, and can appreciably increase the amount of time the user must wait before viewing the query result. These and other deficiencies in existing techniques hinder the user's goal of quickly and efficiently locating the most relevant items, and can lead to user frustration.

SUMMARY OF THE INVENTION

The present invention addresses these and other problems by providing a search refinement system and method for generating and displaying related query terms ("related terms"). In accordance with the invention, the related terms are generating using query term correlation data that is based on historical query submissions to the search engine. The query term correlation data ("correlation data") is preferably based at least upon the frequencies with which specific terms have historically been submitted together within the same query. The incorporation of such historical query information into the process tends to produce related terms that are frequently used by other users in combination with the submitted query terms, and significantly increases the likelihood that these related terms will be helpful to the search refinement process. To further increase the likelihood that the related terms will be helpful, the correlation data is preferably generated only from those historical query submissions that produced a successful query result (at least one match).

In accordance with one aspect of the invention, the correlation data is stored in a correlation data structure (table, database, etc.) which is used to look up related terms in response to query submissions. The data structure is preferably generated using an off-line process which parses a query log file, but could alternatively be generated and updated in real-time as queries are received from users. In one embodiment, the data structure is regenerated periodically (e.g., once per day) from the most recent query submissions (e.g., the last M days of entries in the query log), and thus strongly reflects the current tastes of the community of users; as a result, the related terms suggested by the search engine strongly reflect the current tastes of the community. Thus, for example, in the context of a search engine of an online merchant, the search engine tends to suggest related terms that correspond to the current best-selling products.

In a preferred embodiment, each entry in the data structure is in the form of a key term and a corresponding related terms list. Each related terms list contains the terms which have historically appeared together (in the same query) with the respective key term with the highest degree of frequency, ignoring unsuccessful query submissions (query submissions which produced a NULL query result). The data structure thus provides an efficient mechanism for looking up the related terms for a given query term.

To generate a set of related terms for refining a submitted query (the "present query"), the related terms list for each term in the present query is initially obtained from the correlation data structure. If this step produces multiple related terms lists (as in the case of a multiple-term query), the related terms lists are preferably combined by taking the intersection between these lists (i.e., deleting the terms that are not common to all lists). The related terms which remain are terms which have previously appeared, in at least one successful query submission, in combination with every term of the present query. Thus, assuming items have not been deleted from the database being searched, any of these related terms can be individually added to the present query while guaranteeing that the modified query will not produce a NULL query result. To take advantage of this feature, the related terms are preferably presented to the user via a user interface that requires the user to add no more than one related term per query submission. In other embodiment, the related terms are selected and displayed without guaranteeing a successful query result.

Because the related terms are identified from previously-generated correlation data, without the need to parse documents or correlate terms, the related terms can be identified and presented to the user with little or no added delay.

One aspect of the invention is thus a method of assisting users in refining search queries. The method is performed by a computer system that implements a search engine that is accessible to a community of users. The method comprises receiving a search query submitted by a user, wherein the search query comprises at least one term. The method further comprises using a history of search queries submitted to the search engine over a selected period of time by the community of users to identify at least one refinement to the search query, and suggesting the at least one refinement to the user.

Another aspect of the invention is a system for assisting users in refining search queries submitted to a search engine. The system comprises a first program module which processes query logs of the search engine to generate correlation data that reflects frequencies of occurrences of query terms within the same query. The system further comprises a second program module which uses at least the correlation data to sugguest refinements to search queries received from users.

The invention further includes a method of facilitating the refinement of search queries. The method comprises receiving a search query submitted by a user, and identifying a plurality of refined search queries, each of which comprises all terms of the query submitted by the user and an additional term. The method further comprises presenting each refined search query to the user as a respective link which is selectable to perform a corresponding search, such that the user may select a query refinement and initiate a refined search with a single selection action.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENTS

The present invention provides a search refinement system and method for generating related query terms ("related terms") using a history of queries submitted to a search engine by a community of users. Briefly, the system generates query term correlation data which reflects the frequency with which specific terms have previously occurred together within the same query. The system uses the query term correlation data in combination with the query term(s) entered by the user to recommend additional query terms for refining the query. The incorporation of such historical query information into the process tends to produce related terms that are frequently used by other users in combination with the submitted query terms, and significantly increases the likelihood that these related terms will be helpful to the search refinement process. To further increase the likelihood that the related terms will be helpful, the correlation data is preferably generated only from those historical query submissions that produced a successful query result (at least one match).

In the preferred embodiment, the query term correlation date is regenerated periodically from recent query submissions, such as by using the last M days of entries in a query log, and thus heavily reflects the current tastes of users. As a result, the related terms suggested by the search engine tend to be terms that correspond to the most frequently searched items during the relevant time period. Thus, for example, in the context of a search engine of an online merchant, the search engine tends to suggest related terms that correspond to the current best-selling products. In one embodiment, the technique used to generate the related terms and present these terms to the user guarantees that the modified query will not produce a NULL query result.

The search refinement methods of the invention may be implemented, for example, as part of a web site, an Internet site, an on-line services network, a document retrieval system, or any other type of computer system that provides searching capabilities to a community of users. In addition, the method may be combined with other methods for suggesting related terms, such as methods which process the contents of located documents.

A preferred web-based implementation of the search refinement system will now be described with reference to FIGS. 1–9. For purposes of illustration, the system is described herein in the context of a search engine that is used to assist customers of Amazon.com Inc. in locating items (e.g., books, CDs, etc.) from an on-line catalog of products. Throughout the description, reference will be made to various implementation-specific details of the Amazon.com implementation. These details are provided in order to fully illustrate a preferred embodiment of the invention, and not to limit the scope of the invention. The scope of the invention is set forth in the appended claims.

I. Overview of Web Site and Search Engine

Figure 1:
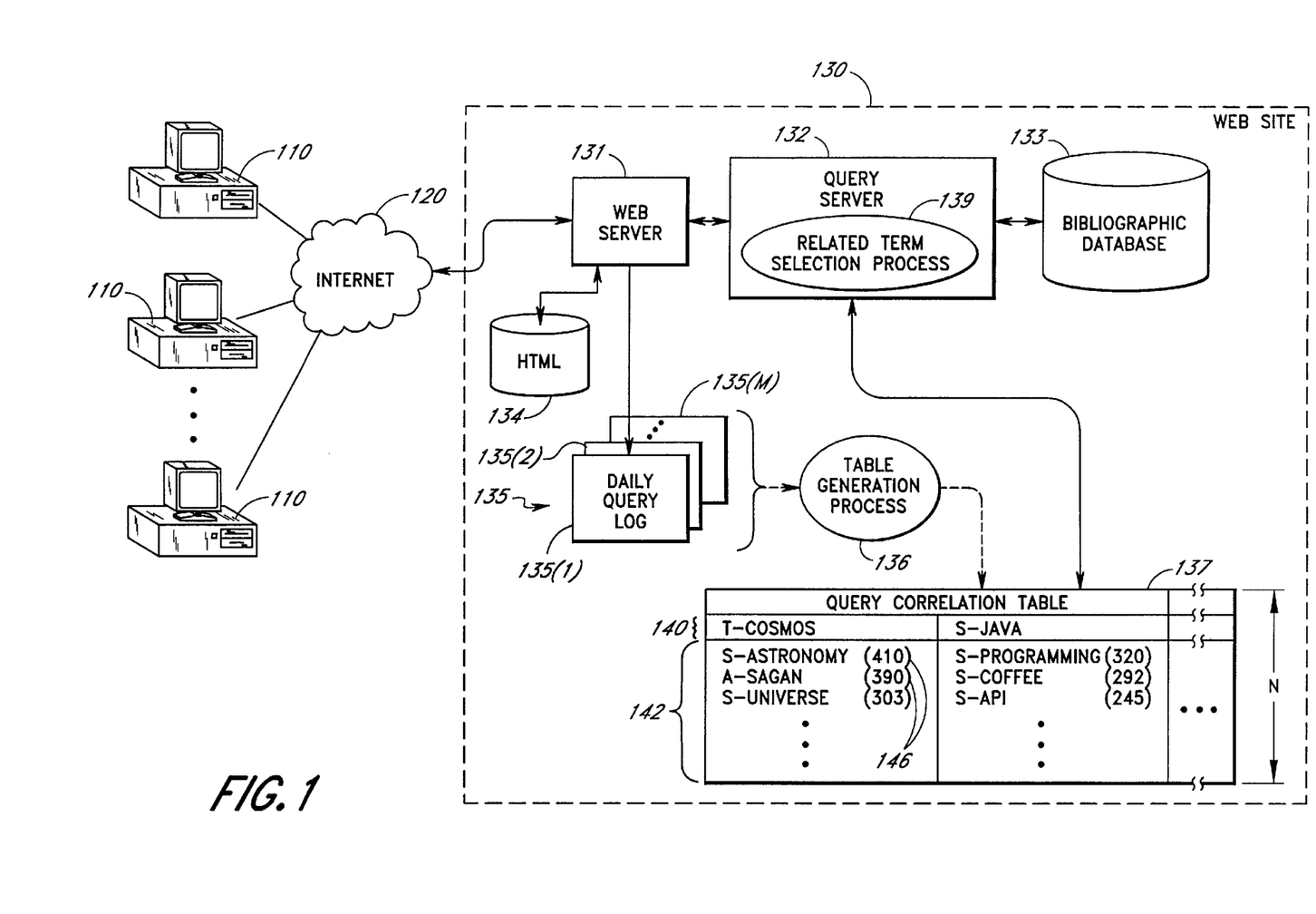
FIG. 1 illustrates a system in which users access web site information via the Internet, and illustrates the basic web site components used to implement a search engine which operates in accordance with the invention.

FIG. 1 illustrates the Amazon.com web site 130, including components used to implement a search engine in accordance with the invention.

As it is well known in the art of Internet commerce, the Amazon.com web site includes functionality for allowing users to search, browse, and make purchases from an on-line catalog of book titles, music titles, and other types of items via the Internet 120. Because the catalog contains millions of items, it is important that the site provide an efficient mechanism for assisting users in locating items.

As illustrated by FIG. 1, the web site 130 includes a web server application 131 ("web server") which processes user requests received from user computers 110 via the Internet 120. These requests include queries submitted by users to search the on-line catalog for products. The web server 131 records the user transactions, including query submissions, within a query log 135. In the embodiment depicted in FIG. 1, the query log 135 consists of a sequence of daily query log files 135(1)–135(M), each of which represents one day of transactions.

The web site 130 also includes a query server 132 which processes the queries by searching a bibliographic database 133. The bibliographic database 133 includes information about the various products that users may purchase through the web site 130. This information includes, for example, the titles, authors, publishers, subject descriptions, and ISBNs (International Standard Book Numbers) of book titles, and the titles, artists, labels, and music classifications of music titles. The information for each item is arranged within fields (such as an "author" field and a "title" field), enabling the bibliographic database 133 to be searched on a field-restricted basis. The site also includes a database 134 of HTML (Hypertext Markup Language) content which includes, among other things, product information pages which show and describe the various products.

The query server 132 includes a related term selection process 139 which identifies related query terms based on query term correlation data stored in a correlation table 137. As depicted in FIG. 1 and described below, the correlation table 137 is generated periodically from the M most recent daily query log files 135(1)–135(M) using an off-line table generation process 136.

The web server 131, query server 132, table generation process 136, and database software run on one or more Unix™-based servers and workstations (not shown) of the web site 130 although other types of platforms could be used. The correlation table 137 is preferably cached in RAM (random access memory) on the same physical machine as that used to implement the query server 132. To accommodate large numbers of users, they query server 132 and the correlation table 137 can be replicated across multiple machines. The web site components that are invoked during the searching process are collectively referred to herein as a "search engine."

Figure 2:
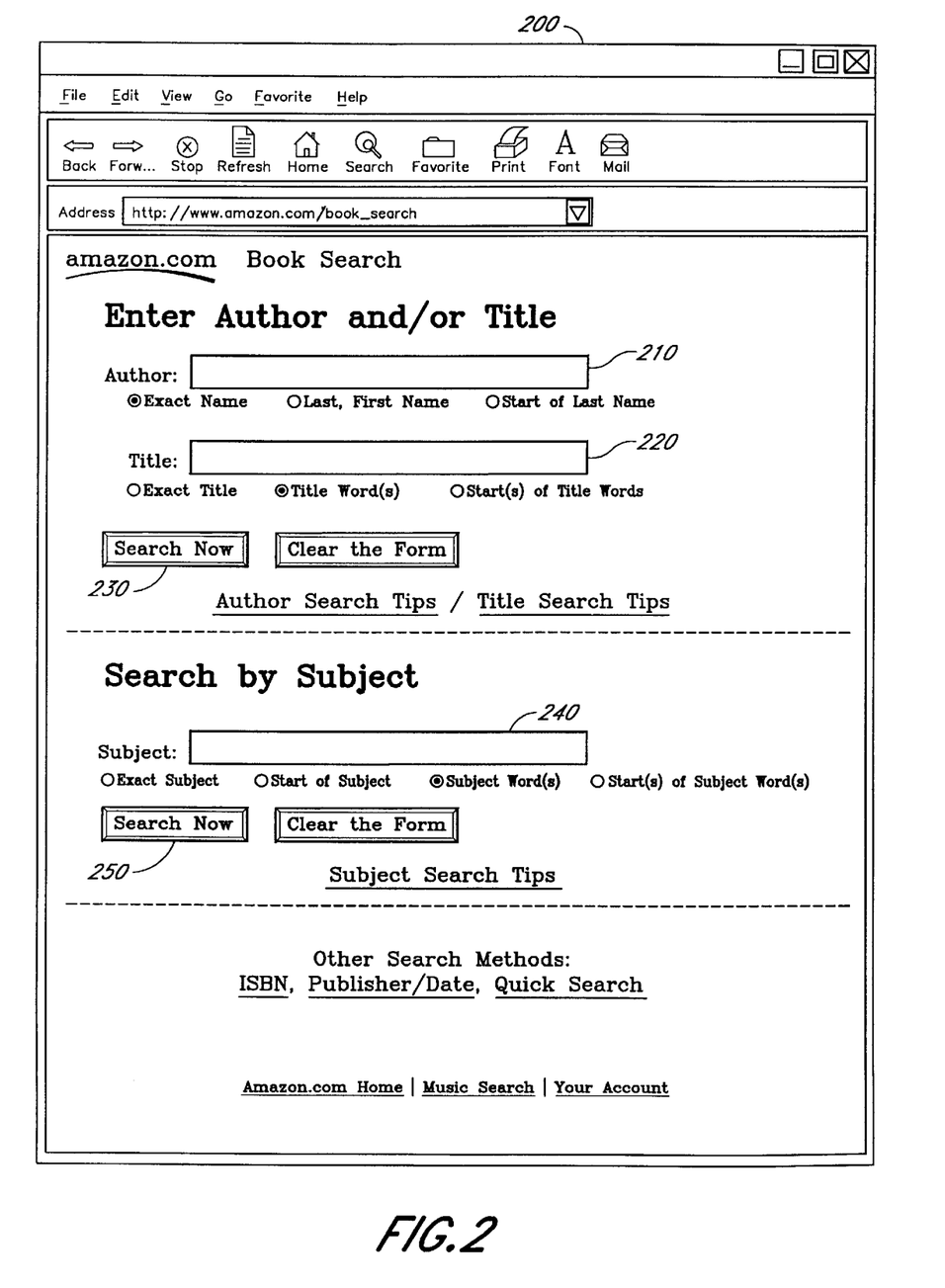
FIG. 2 illustrates a sample book search page of the web site.

FIG. 2 illustrates the general format of a book search page 200 of the Amazon.com web site 130 that can be used to search the bibliographic database 133 for book titles. Users have access to other search pages that can be used to locate music titles and other types of products sold by the on-line merchant. The book search page 200 includes author, title, and subject fields 210, 220, 240 and associated controls that allow the user to initiate field-restricted searches for book titles. Users can perform searches by first typing in the desired information into a search field 210, 220, 240 and then clicking on the appropriate search button 230, 250. The term or string of terms submitted to the search engine is referred to herein as the "query." Other areas of the web site ask the user to submit queries without limiting the terms to specific fields.

When the user submits a query from the book search page 200 to the web site 130, the query sever 132 applies the query to the bibliographic database 133, taking into account any field restrictions within the query. If the query result is a single item, the item's product information page is presented to the user. If the query result includes multiple items, the list of items is presented to the user through a query result page which contains hypertextual links to the items' respective product information pages.

For multiple-term queries, the query server 132 effectively logically ANDs the query terms together to perform the search. For example, if the user enters the terms "JAVA" and "PROGRAMMING" into the title field 220, the query server 132 will search for and return a list of all items that have both of these terms within the title. Thus, if any query term does not produce a match (referred to herein as a "non-matching term"), the query will produce a NULL query result. Presenting a NULL query result to the user can cause significant user frustration. To reduce this problem, in this event, the user may be presented with a list of items that are deemed to be "close matches." Although the search engine described herein logically ANDs the query terms together, it will be recognized that the invention can be applied to search engines that use other methods for processing queries.

In accordance with the invention, the search engine uses the query term correlation data stored in the correlation table 137 to select the related terms that best match the user's query. The search engine then presents the related terms to the user, allowing the user to refine the search and enhance discovery of relevant information. The query term correlation data indicates relationships between query terms, and is used to effectively predict query terms that are likely to be helpful to the search refinement process. In accordance with another aspect of the invention, the correlation table 137 preferably contains or reflects historical information about the frequencies with which specific query terms have appeared together within the same query.

The general format of the correlation table 137 is illustrated in FIG. 1. In the embodiment depicted in FIG. 1 and described in detail herein, the correlations between query terms are based solely on frequency of occurrence within the same query. As described below, other types of query term correlations can additionally be used. In addition, although the disclosed implementation uses a table to store the query term correlation data, other types of databases can be used.

As illustrated by FIG. 1, each entry within the correlation table 137 (two entries shown) has two primary components: a "key" term 140, and a "related terms" list 142 for that key term. The related terms list 142 is a list of the N (e.g. 50) query terms that have appeared within the same query as the keyword with the highest degree of frequency, and is ordered according to frequency. For example, the entry for the key term COSMOS (ignoring the single-term prefixes, which are discussed below) is:

COSMOS: ASTRONOMY, SAGAN, UNIVERSE, . . .

indicating that ASTRONOMY has appeared together with COSMOS with the highest degree of frequency; SAGAN has appeared with COSMOS with the second highest degree of frequency, and so on. Each term that appears within the related terms list 142 is deemed to be related to the corresponding key term 140 by virtue of the relatively high frequency with which the terms have occurred within the same query.

As further depicted by FIG. 1, each related term and each key term 140 preferably includes a single-character field prefix which indicates the search field 210, 220, 240 to which the term corresponds. These prefixes may, for example, be as follows: A=author, T=title, S=subject, R=artist, L=label, G=generic. In addition, each related term is stored together with a correlation score 146 which, in the preferred embodiment, indicates the number of times the related term has appeared in combination with the key term (within the search fields indicated by their respective field prefixes), not counting queries that produced a NULL query result.

Thus, for example, the related term (including prefix) S-ASTRONOMY has a correlation score of 410 under the key term T-COSMOS, indicating that four hundred and ten "successful" queries were received (during the time period to which the table 137 corresponds) which included the combination of COSMOS in the title field and ASTRONOMY in the subject field. Although the field prefixes and correlation scores 146 carry information which is useful to the related terms selection process (as described below), such information need not be preserved.

In operation, when a user submits a query to the web site 130, the web server 131 passes the query to the query server 132, and the query server applies the query to the bibliographic database 133. If the number of items found exceeds a certain threshold (e.g., 50), the query server 132 invokes its related term selection process ("selection process") 139 to attempt to identify one or more related terms to suggest to the user. The selection process may alternatively be invoked without regard to whether a certain item count has been reached.

For each term in the query, the selection process 139 retrieves the respective related terms list 142 (if any) from the correlation table 137, and if multiple lists result, merges these lists together. The selection process 139 then takes a predetermined number (e.g. 5) of the related terms from the top of the resulting list, and passes these "suggested terms" to the web server 131 with the query result listing. Finally, the web server 131 generates and returns to the user a query result page (FIG. 9) which presents the suggested terms to the user for selection.

In one embodiment, the related terms lists are merged by retaining only the intersecting terms (terms which are common to all lists), and discarding all other terms. An important benefit of this method is that any single related term of the resulting list can be added to the query without producing a NULL query result. To take advantage of this feature, these related terms are preferably presented to the user using an interface method (as in FIG. 9) which requires the user to add only one related term to the query per query submission.

The operation of the related term selection process 139 is described in further detail below.

The disclosed search engine also preferably uses historical query submissions and item selections to rank query results for presentation to the user. A preferred method for ranking query results based on such data is disclosed in U.S. patent application Ser. No. 09/041,081 filed Mar. 10, 1998. The search engine also preferably uses correlations between query terms to correct misspelled terms within search queries. A preferred method for correcting spelling errors in search queries is disclosed in U.S. patent application Ser. No. 09/115,662 entitled "System and Method for Correcting Spelling Errors in Search Queries," filed Jul. 15, 1998. The disclosures of these applications are hereby incorporated by reference.

II. Capturing and Processing of Query Information

As indicated above, the query term correlation data is preferably generated from the query log 135 using the table generation process ("generation process") 136. In the preferred embodiment, the table generation process 136 is implemented as an off-line process which runs once a day and generates a new query correlation table 137. The process effectively generates the table from the M most recent daily query log files 135(1)–135(M). Using a relatively small M (e.g., 5) tends to produce query term correlation data that heavily reflects short term buying trends (e.g., new releases, weekly best-sellers, etc.), while using a larger M (e.g., 100) tends to produce a more comprehensive database. A hybrid approach can alternatively be used in which the table is generated from a large number of log files, but in which the most recent log files are given greater weight. For example, queries submitted during the last week can be counted three times when generating the correlation scores 146, while queries submitted from one week to one month ago can be counted only once. In addition, rather than using M consecutive days of query submissions, the generation process 136 could use samples of query submissions from multiple different time periods.

Figure 6:
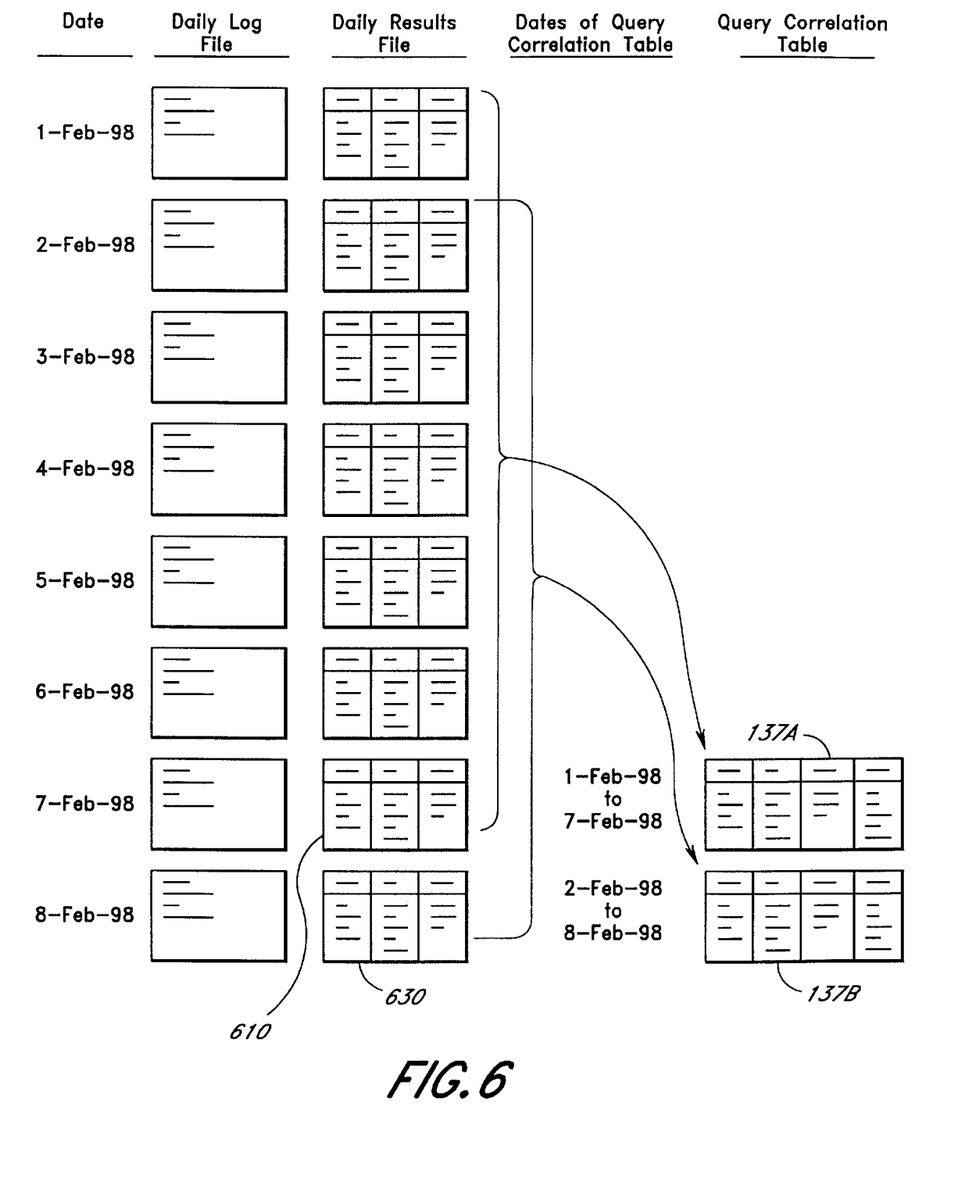
FIG. 6 illustrates a process for generating the correlation table from the most recent daily query log files.

In the preferred embodiment, the building of the query correlation table 137 consists of two primary phases: (1) generating daily log files, and (2) periodically parsing and processing these log files to generate the query correlation table 137. Rather than generate new query term correlation data each time log information becomes available, the generation process 136 preferably generates and maintains separate query term correlation data for different constituent time periods of a relatively short length. In the preferred embodiment, the constituent time period is one day such that query term correlation data for a single day is stored in a daily results file. Each time query term correlation data is generated for a new constituent time period, the generation process 136 preferably combines this new data with existing data from earlier constituent time periods to form a collective query correlation table with information covering a longer composite period of time. This process is depicted in FIG. 6 and is described further below.

Any of a variety of alternative methods could be used to generate the correlation table 137. For example, the generation process 136 could alternatively be implemented to update the query correlation table in real time by augmenting the table each time a user submits a successful query. In addition, the table generation process 136 and/or the selection process 139 could take into consideration other types of correlations between query terms, including extrinsic or "static" correlations that are not dependent upon the actions of users.

A. Generating Daily Query Log Files

A web server generally maintains a log file detailing all of the requests it has received from web browsers. The log file is generally organized chronologically and is made up of several entries, each containing information about a different request.

Figure 3:
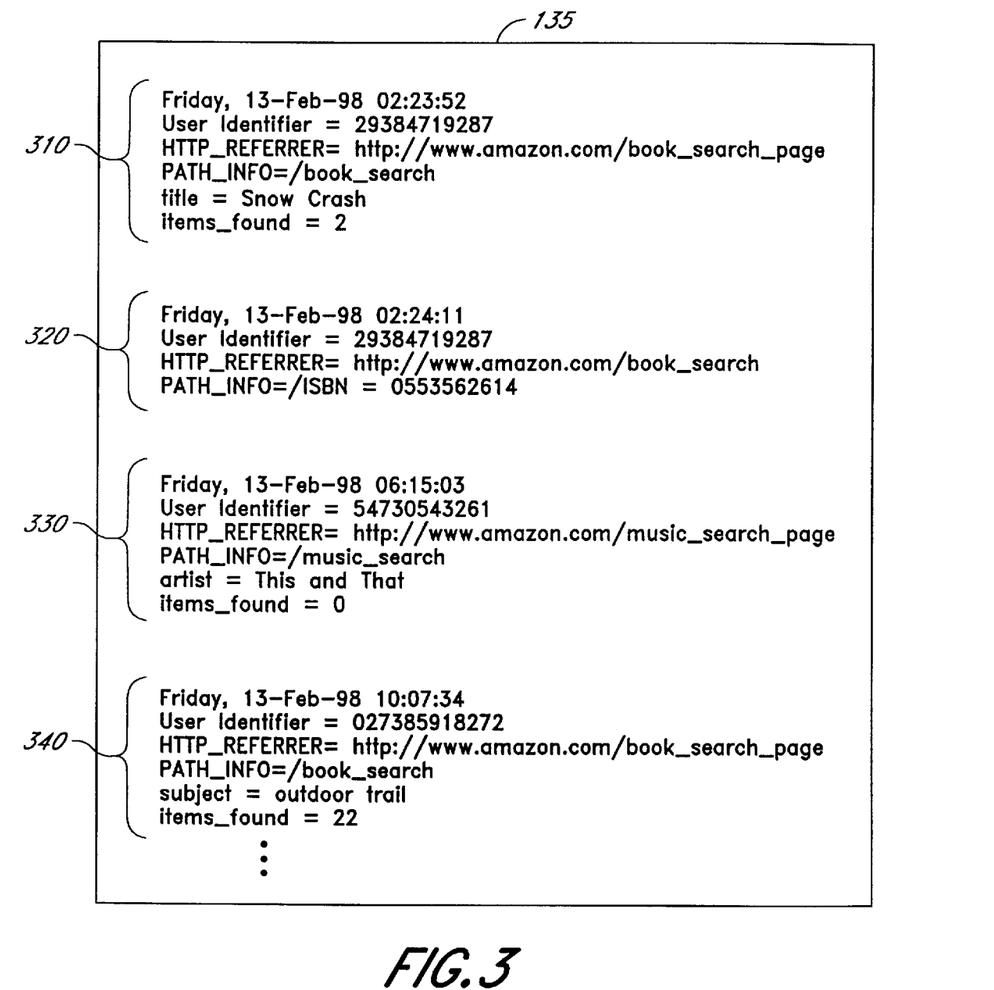
FIG. 3 illustrates sample log entries of a daily query log file.

In accordance with the invention, each time a user performs a search, the web server 131 stores information about the submitted query in a log entry of a query log 135. In addition, the web server 131 generates daily query log files 135(1)–135(M) which each contain the log entries for a respective day. FIG. 3 illustrates four log entries of a sample daily query log file 135. Each entry in the log file 135 includes information about a particular HTTP (Hypertext Transfer Protocol) transaction. The first log entry 310 contains date and time information for when the user submitted the query, the user identifier corresponding to the identity of the user (and, in some embodiments, identification of the particular interaction with the web server), the name of the web page where the query was entered, query terms entered by the user, and the number of the items found for the query. The "items_found" values in the log preferably indicate the number items that exactly matched the query.

For example, entry 310 indicates that at 2:23 AM on Feb. 13, 1998, user 29384719287 submitted the query {title= Snow Crash} from the book search page and that two items were found that exactly matched the query. Entry 320 indicates that the same user selected an item having an ISBN of 0553562614 about twenty seconds later, and that this selection was made from a search results page (as is evident from the HITP_REFERRER line). Other types of user actions, such as a request to place an item in a shopping cart or to purchase an item, are similarly reflected within the query log 135. As indicated by the above example, a given users navigation path can be determined by comparing entries within the query log 135.

B. Generating the Correlation Table

Figure 4:
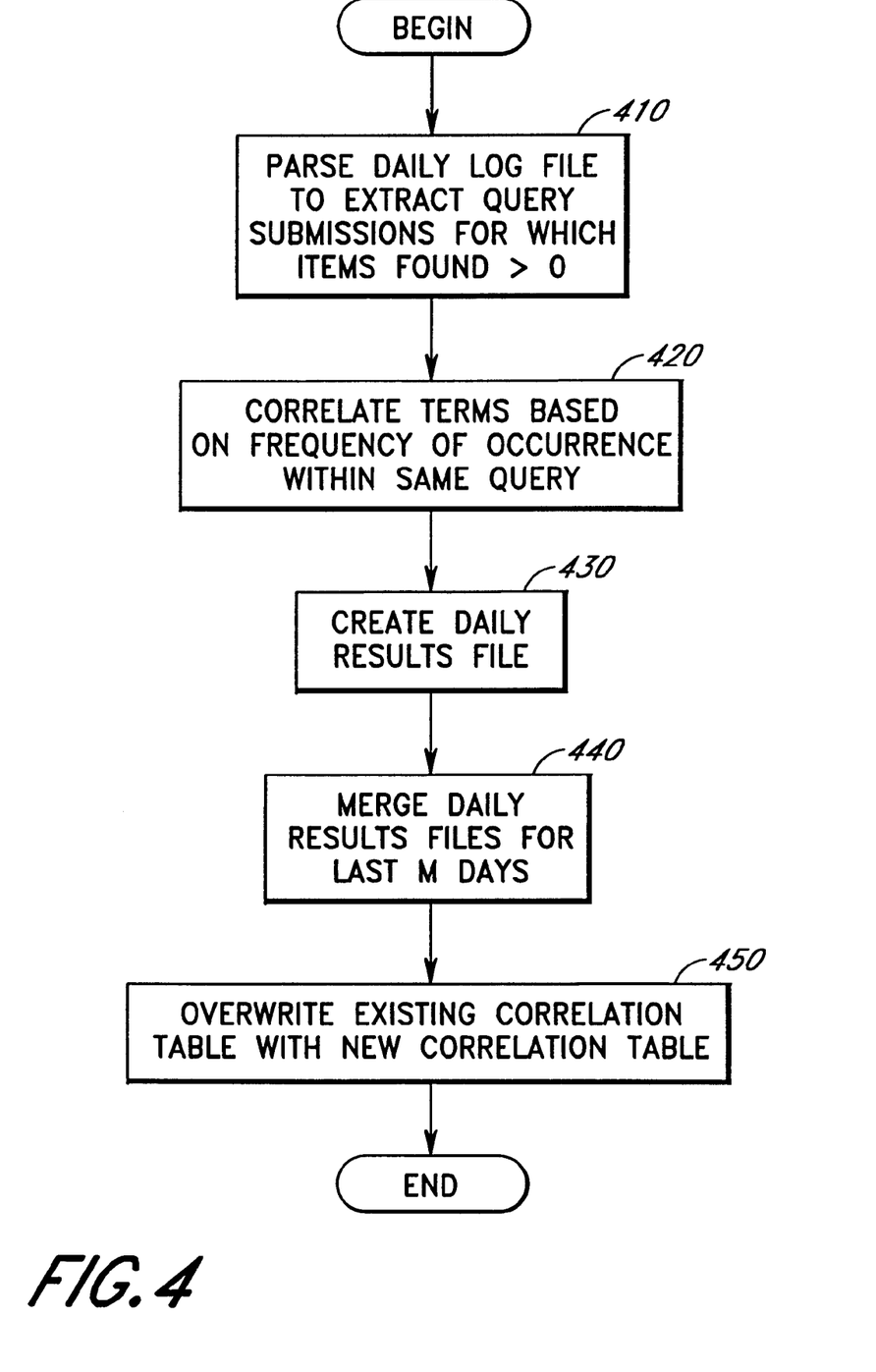
FIG. 4 illustrates the process used to generate the correlation table of FIG. 1.

FIG. 4 shows the preferred method for generating the correlation table 137. In tep 410 the generation process 136 goes through the most recent daily query log file to identify all multiple-term queries (i.e., queries comprised of more than one term) that returned at least one item ("items_found">0) in the query result. In step 420, the generation process 136 correlates each query ("key") term found in the set of queries to related terms that were used with the key term in a particular query, and assigns the related term a correlation score 146. The correlation score indicates the frequency with which specific terms have historically appeared together within the same query during the period reflected by the daily query log. In step 430, the generation process 136 stores the terms coupled with their correlation scores in a daily results file. In step 440, the generation process 136 merges the daily results files for the last M days. Finally, in step 450, the generation process 136 creates a new correlation table 137 and replaces the existing query correlation table.

In the preferred embodiment, the generation process 136 is executed once per day at midnight, just after the most recent daily query log is closed. In addition, it is assumed that the M−1 most recent daily query logs have already been processed by steps 410–430 of the process to generate respective daily results files.

Each of the steps 410–450 of the FIG. 4 process will now be described in greater detail.

Step 1: Processing the daily query log file

As indicated above, the generation process 136 parses the daily query log file in step 410 to identify and extract successful multi-term queries. Ignoring the query submissions that produced a NULL query result (items_found=0) provides the important benefits of (1) preventing non-matching terms from being added to the correlation table— either as keywords or as related terms—and (2) excluding potentially "weak" correlations between matching terms from consideration. In addition, as described below, excluding such "unsuccessful" query submissions enables the query terms selection process 139 to be implemented so as to guarantee that the modified query will produce a successful query result (i.e., a query result in which the item count is greater than zero).

Using the FIG. 3 log sequence as an example, the generation process 136 would parse the sample daily query log file 135 beginning with log entry 310. The generation process 136 would extract the query for the first log entry 310 because the query contains more than one query term and "items_found" is greater than zero. Next, the generation process 136 would ignore entry 320 because it contains no query terms. The generation process 136 would then ignore entry 330 because although there are multiple query terms, the number of items found is not greater than zero. The generation process 136 would next extract the log entry 340 and continue through the daily query log file 135. In some embodiments, other information such as query field or subsequent actions performed by the user may be used to determine which query submissions to extract or how heavily the queries should be weighted. In addition, other methods may be used to extract the information from the query log.

Step 2: Correlate terms

In accordance with the invention, the generation process 136 first takes each extracted query, and for each query term, adds a single-character field prefix ("prefix") which indicates the search field in which the query term was entered. Thus, for example, using the prefixes listed above, the prefix "T" would be added to the terms "SNOW" and "CRASH," in log entry 310, and the prefix "S" would be added to the terms "OUTDOOR" and "TRAIL," in log entry 340. During this process, identical terms that were submitted in different search fields are assigned different prefixes and are treated as different terms. For example, the term "SNOW" with a prefix of "T" would be treated as different from "SNOW" with the prefix "S." In the implementation described herein, the key term and related terms are stored without regard to alphabetic case, although case information can alternatively be preserved.

The generation process 136 then maps each query ("key") term found in the query and its prefix to other terms ("related terms") used with that particular query. A correlation score is maintained for each related term in the mapping based on the number of times the related term occurred in combination with the key term. The final values of the correlation scores taken over M days are stored within the query correlation table 137 as the correlation scores 146 depicted in FIG. 1.

For example, if a user submits the query "ROUGH GUIDE TO LONDON," in the title field 220, the terms would first be coupled with the prefix "T." The correlation scores in the mapping for "T-GUIDE," "T-TO," and "T-LONDON," relative to the key "T-ROUGH," would be incremented. Similarly, the correlation scores for the related terms under the keys "T-GUIDE," "T-TO," and "T-LONDON" would also be incremented.

Figure 5A:
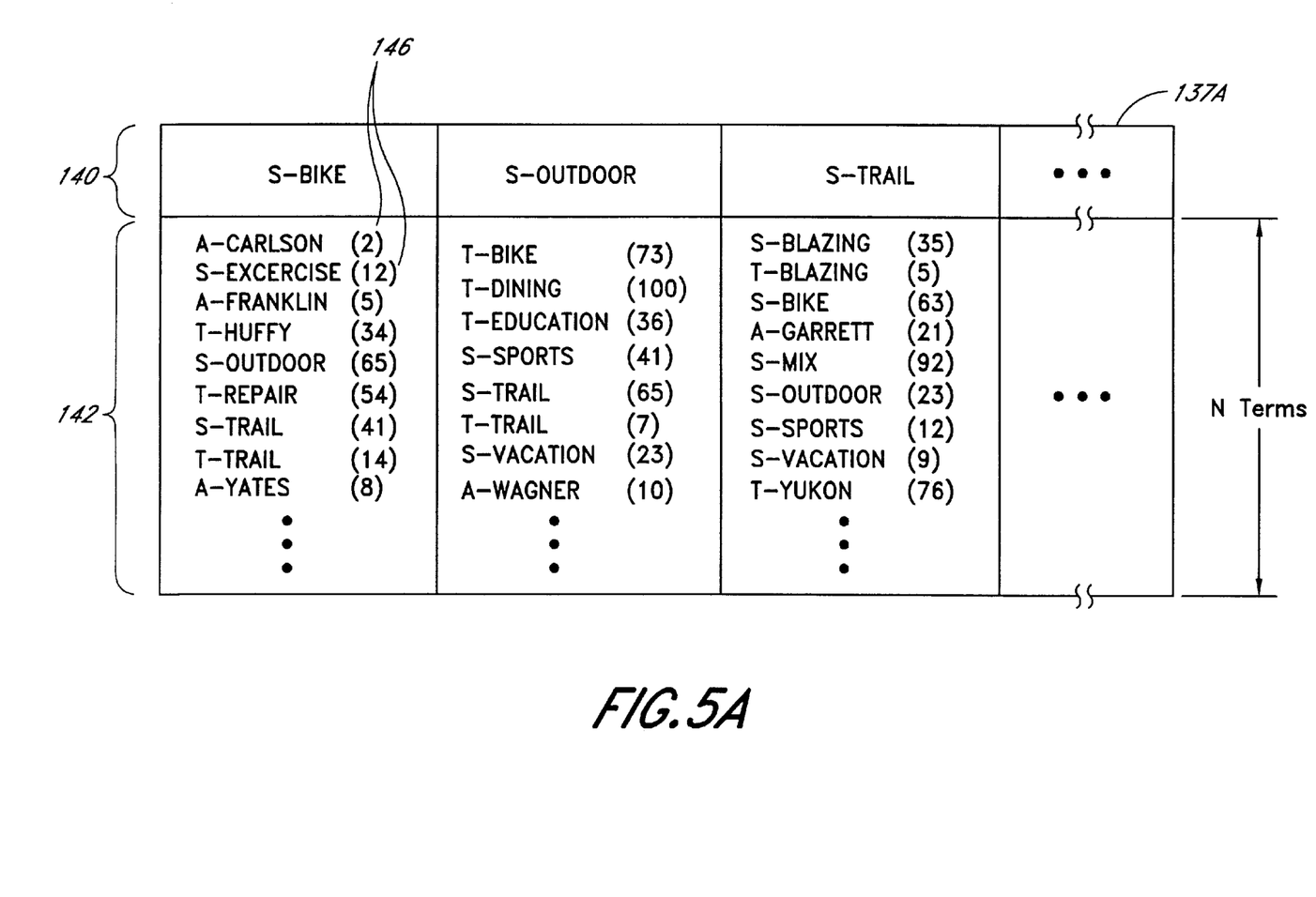
FIG. 5A illustrates a sample mapping before a query is added.
Figure 5B:
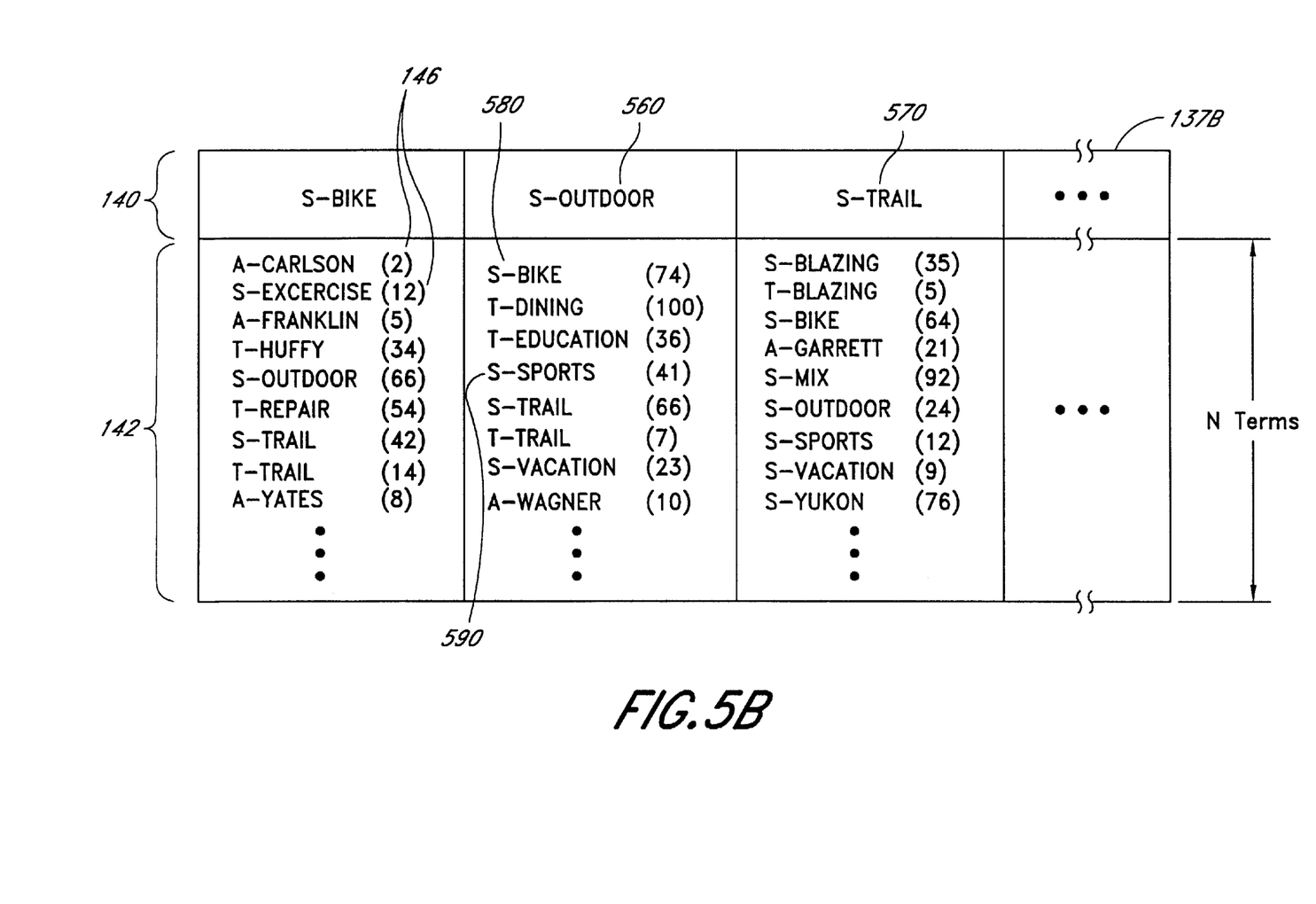
FIG. 5B illustrates a sample mapping after a query is added.

FIG. 5A illustrates an example mapping. In this figure, it is assumed that the generation process 136 has already processed many thousands of log entries. For each key term 140 stored in the table 137A, there is a related terms list 142 such that each related term in the list is coupled with a prefix and a value 146 representing the correlation score. Each time the key term 140 and a related term 142 are used together in a query, the related term's value 146 is incremented.

Assume that the table generation process 136 parses a query "OUTDOOR BIKE TRAIL" submitted in the subject field. FIG. 5A shows the mapping before the query is added. In response to the query, the generation process 136 updates the mapping 137A producing the mapping 137B shown in FIG. 5B. The generation process 136 first looks up the key term "S-OUTDOOR" 560 and then looks for the related terms "S-BIKE" 580 and "S-TRAIL" 590. If the related term is found, its value is incremented. If the related term is not found, the generation process 136 adds the related term and assigns it a beginning value. In the example shown in FIG. 5B, the values for both "S-BIKE" 580 and "S-TRAIL" 590 have been incremented by one. Note that under the key term "TOUTDOOR," the value for the term "S-TRAIL" was incremented while the value for the term "T-TRAIL" was not incremented. This is because the query was submitted in the subject field, thus affecting only terms with the prefix "S."

In some embodiments, certain key terms may be excluded from the mapping if they are frequently used, and yet do not further the search refinement process. For example, common articles such as "THE," "A," "TO," and "OF" may be excluded from the mapping. While only three partial entries are depicted in FIG. 5A, many thousands of entries would be stored in a typical daily results file. In the preferred implementation, the mapping for a daily query log file is stored in a B-tree data structure. In other embodiments, a linked list, database, or other type of data structure can be used in place of the B-tree.

In addition, the amount by which the correlation scores are incremented may be increased or decreased depending on different kinds of selection actions performed by the users on items identified in query results. These may include whether the user displayed additional information about an item, how much time the user spent viewing the additional information about the item, how many hyperlinks the user followed within the additional information about the item, whether the user added the item to his or her shopping basket, and whether the user ultimately purchased the item. For example, a given query submission can be counted twice (such as by incrementing the correlation score by two) if the user subsequently selected an item from the query result page, and counted a third time if the user then purchased the item or added the item to the shopping basket. These and other types of post-search activities reflect the usefulness of the query result, and can be extracted from the query log 135 using well-known tracing methods.

Step 3: Create Daily Results File

Once the mapping is complete, that is, all entries in the daily query log file have been parsed, the generation process 136 creates a daily results file (step 430) to store the B-tree. In other embodiments, the daily results file may be generated at an earlier stage of the process, and may be incrementally updated as the parsing occurs.

Step 4: Merge Daily Results Files

In step 440, the generation process 136 generates the query correlation table 137 for a composite period by combining the entries of the daily results files for the length of the composite period. As depicted in FIG. 6, the table generation process 136 regenerates the query correlation table 137 on a daily basis from the M most recent daily results files, where M is a fixed number such as 10 or 20. Each day, the daily results file created in step 430 is merged with the last M−1 daily results files to produce the query correlation table 137

For example, in FIG. 6, suppose the generation process 136 generates a daily results file for Feb. 7, 1998 610 and is set to generate a new query correlation table for the period of the last seven days (M=7). At the end of Feb. 7, 1998, the generation process 136 would merge the daily results files from the past seven days for the composite period of Feb. 1, 1998 to Feb. 7, 1998 to form a new query correlation table 137A. At the end of Feb. 7, 1998, the generation process 136 would generate a daily results file for Feb. 8, 1998 630 and then merge the daily results files from the past seven days for the composite period of Feb. 2, 1998 to Feb. 8, 1998 to form a new query correlation table 137B. When the entries are merged, the scores of the corresponding entries are combined, for example, by summing them. In one embodiment, the scores in more recent daily results files are weighted more heavily than those scores in less recent daily results files, so that the query term correlation data more heavily reflects recent query submissions over older query submissions. This "sliding window" approach advantageously produces a query correlation table that is based only on recent query submissions, and which thus reflects the current preferences of users. For example, if a relatively large number of users have searched for the book Into Thin Air by Jon Krakauer over the past week, the correlations between the terms "T-INTO," "T-THIN," "T-AIR," and "A-KRAKAUER" will likely be correspondingly high; a query which consists of a subset of these terms will thus tend to produce a related terms lists which includes the other terms.

Step 5: Replace Old Query Correlation Table With New Query Correlation Table

In step 450, once the daily results files have been merged, the generation process 136 sorts the related terms lists from highest-to-lowest score. The generation process 136 then truncates the related terms lists to a fixed length N (e.g., 50) and stores the query correlation table in a B-tree for efficient lookup. The new query correlation table 137 B-tree is then cached in RAM (random access memory) in place of the existing query correlation table.

III. Using the Table to Generate Related terms

As indicated above, the query server 132 uses the query correlation table 137 to select related terms to be suggested to the user. More specifically, when a user performs a search which identifies more than a predetermined number of items, the related term selection process ("selection process") 139 returns a query result listing items that match the query along with a set of related terms generated from the query correlation table. An important benefit of this method is that it is highly efficient, allowing the query result page to be returned without adding appreciable delay. Further, the small delay added by the related terms selection process can be completely avoided by optionally generating the related terms concurrently with the search of the bibliographic database 133 (rather than waiting to see if a threshold item count is reached).

Figure 7:
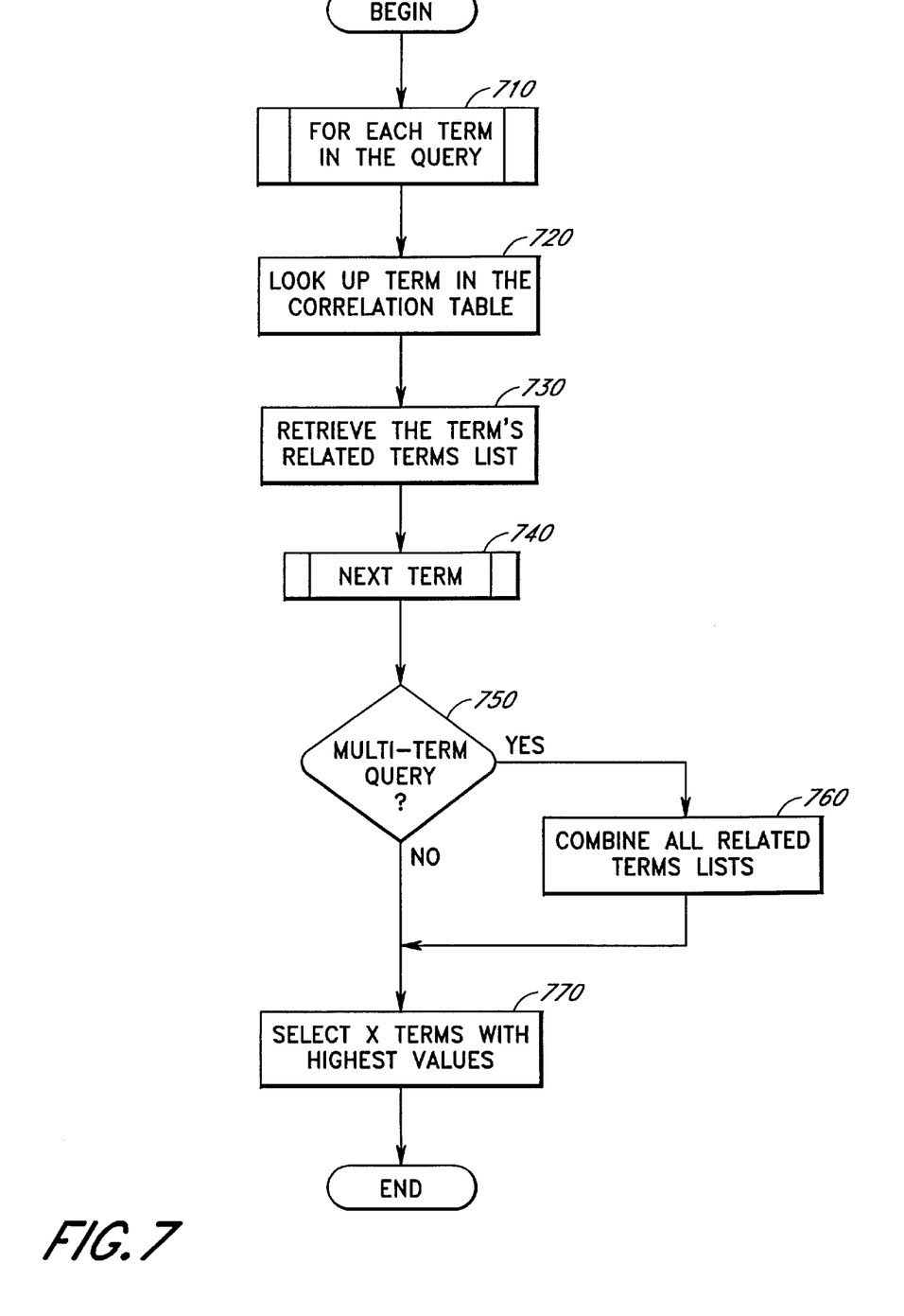
FIG. 7 illustrates a process for selecting the related query terms from the correlation table.

FIG. 7 illustrates the sequence of steps performed by the selection process 139. The selection process 139 first enters a loop (steps 710–740) in which the selection process 139 looks up a query term in the correlation table and then retrieves the term's related terms list 142. This continues for each term in the query. Next, if the query has multiple terms, in step 760, the selection process 139 combines the related terms lists. The lists are preferably combined by taking the intersection of the related terms lists (i.e., deleting terms which do not appear in all lists) and summing the correlation scores of the remaining terms. At this point, every term which remains in the list is a term which has appeared, in at least one prior, successful query, in combination with every term of the present query. Thus, assuming entries have not been deleted from the bibliographic database 133 since the beginning of the composite time period (the period to which the table 137 applies), any of these terms can be added individually to the present query without producing a NULL query result. In other embodiments, the selection process 139 combines the related terms lists by summing the correlation scores of terms common to other related terms lists, without deleting any terms. Another implementation might give weighted scores for intersecting terms such that terms appearing in more than one related terms list are weighted heavier than those terms appearing only in a single related terms list.

In step 770, the selection process 139 selects the X terms with the highest values from the list, where X can be any desired number. In one embodiment, the selection process 139 chooses the top X related terms without regard to the field prefixes of these related terms. The selection process may alternatively be configured to select only those related terms that correspond to the search field(s) of the present query; for example, if the query was entered into the subject field 240 (FIG. 2), the user may be presented only with other subject terms (related terms with the prefix "S").

Figure 8A:
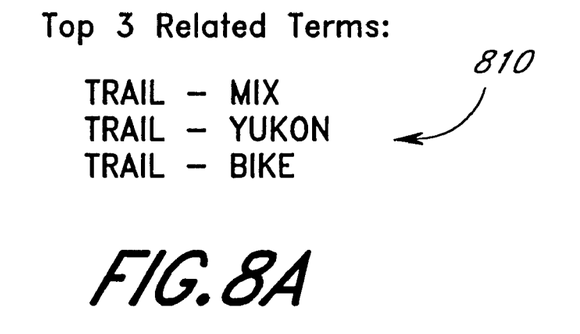
FIG. 8A illustrates a set of related query terms from a single-term query.

For single-term queries, the selection process 139 thus retrieves the top X terms from the table. FIG. 8A illustrates the related terms that would be generated for a single-term query of "TRAIL" in the subject field using the mapping from FIG. 5B. The selection process 139 would look up the key term "S-TRAIL" 570 and select X related terms with the highest X values. For example, suppose the selection process 139 were configured to suggest three related terms (X=3) that correspond to the search field(s) of the present query. The selection process 139 would then look up the key term "S-TRAIL" 570 and display the three related terms with the top three values 810 and with the same prefix as the key term, as illustrated in FIG. 8A.

Figure 8B:
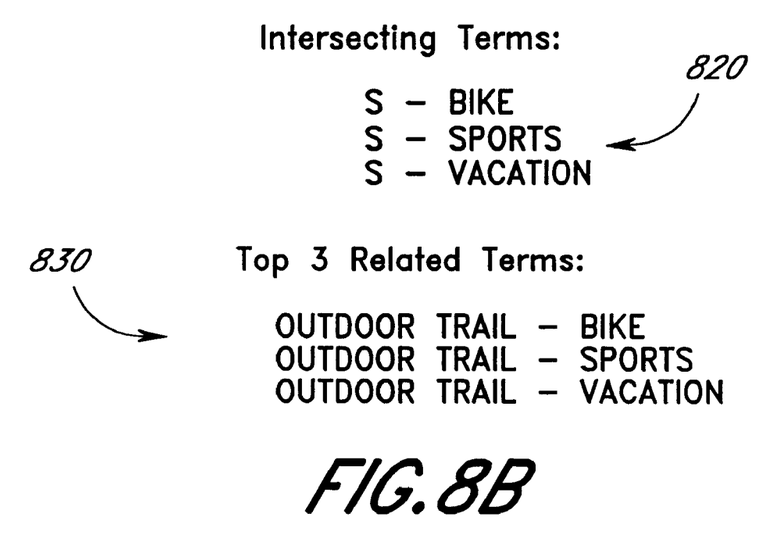
FIG. 8B illustrates a set of intersecting terms and a set of related query terms from a multiple-term query.

For multiple-term queries, the selection process 139 obtains the related terms lists 142 for each of the query terms, and then takes the intersection of these lists. FIG. 8B illustrates the related term results for a multiple-term query in the subject field of "OUTDOOR TRAIL" using the mapping from FIG. 5B. The selection process 139 would look up the key terms "S-OUTDOOR" 560 and "S-TRAIL" 570 and see if they have any related terms in common. In the mapping, the related terms "S-BIKE," "S-SPORTS," and "S-VACATION" are found under the key terms "S-OUTDOOR" 560 and "S-TRAIL," 570; thus "S-BIKE," "S-SPORTS," and "S-VACATION" are the intersecting terms 820 as illustrated in FIG. 8B. The selection process 139 would then display the X intersecting terms with the same prefix and the X highest summed correlation scores. If there were less than X intersecting, related terms, the selection process 139 could show the intersecting terms with any prefix or use other criteria to generate the remaining related terms. For example, the process 139 could take the top Y terms with the highest summed correlation scores from the non-intersecting related terms, although suggesting such terms could produce a NULL query result.

As indicated above, the method can alternatively be implemented without preserving or taking into account search field information. In addition, the method can be appropriately combined with other techniques for generating related terms, including techniques which use the contents of the query result.

IV. Presenting the Related Query terms to the User

There are a number of different ways to present the related terms to the user, including the conventional methods (check boxes and drop-down menus) described above. In implementations which suggest only the intersecting related terms, an interface which requires the user to add no more than one related term per query submission is preferably used, so that the modified query will not produce a NULL query result.

In the preferred embodiment, the related terms are presented though hypertextual links which combine both the original query term(s) and a respective related term. For example, if the user enters the query "ROUGH" in the subject field, three additional hyperlink may be displayed on the query result page, each of which generates a modified search when clicked on by the user. Each of these links is formed by combining the user's query with a related term (e.g., the three hyperlinks might be "ROUGH—GUIDE," "ROUGH—LONDON," and "ROUGH—TERRAIN"). When the user clicks on one of these links, the corresponding modified query is submitted to the search engine. The method thus enables the user to select and submit the modified query with a single action (e.g., one click of a mouse). As an inherent benefit of the above-described method of generating the related terms, each such link produces as least one "hit."

Figure 9:
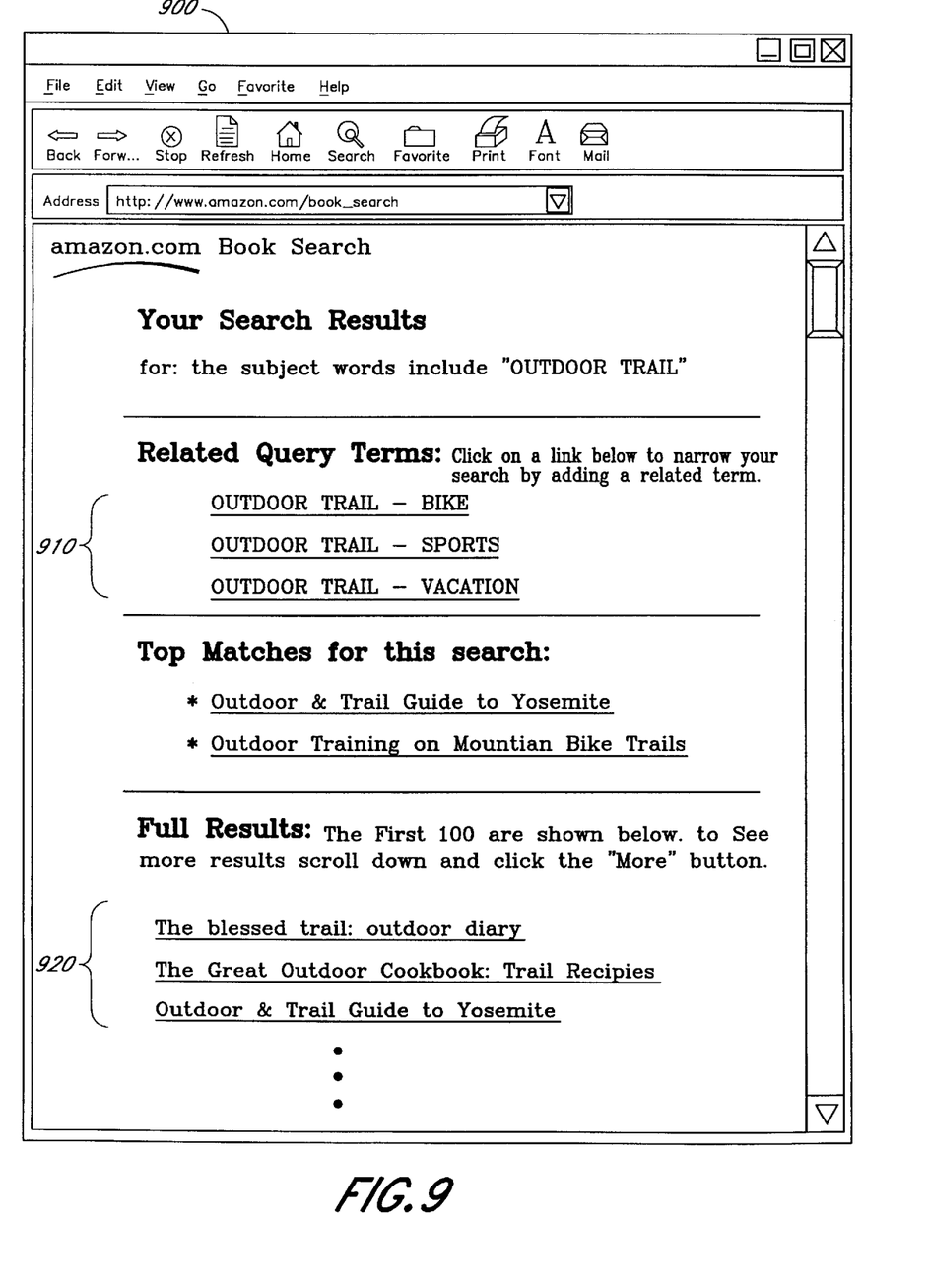
FIG. 9 illustrates a sample search result page of the web site.

FIG. 9 illustrates a sample query result page 900 in which a user has performed a subject field search on the terms "OUTDOOR TRAIL" and has received a set of three related terms, each of which is incorporated into a respective hyperlink 910. The page will also typically contain a listing of the query result items 920. If the user clicks on the hyperlink "OUTDOOR TRAIL—BIKE," the search engine will perform a search using the terms "S-OUTDOOR," "S-TRAIL," and "S-BIKE," and will then return the associated items. The query result page 900 may also have search fields (not shown) for allowing the user to edit the query.

Any of a variety of additional techniques can be used in combination with this hyperlink-based interface. For example, in one embodiment, the query server 132 automatically selects the related term at the top of related terms list (such as the term "bike" in the FIG. 9 example), and searches the query result to identify a subset of query result items that include this related term. The query server 132 thereby effectively applies the "top" suggested modified query to the bibliographic database 133. This process could be repeated using additional related terms in the list. The items within the subset can then be displayed to the user at the top of the query result list, and/or can be displayed in highlighted form. Further, the query server 132 could cache the list of items that fall within the subset, so that if the user submits the modified query (such as by clicking on the link "OUTDOOR BIKE—TRAIL" in FIG. 9), the query server could return the result of the modified search without having to search the bibliographic database. Special tags or codes could be embedded within the modified-query hyperlinks and passed to the web site 130 to enable the query server 132 to match the modified queries to the cached results.

Although this invention has been described in terms of certain preferred embodiments, other embodiments that are apparent to those of ordinary skill in the art are also within the scope of this invention. Accordingly, the scope of the present invention is defined only by reference to the appended claims.

In the claims which follow, reference characters used to denote process steps are provided for convenience of description only, and not to imply a particular order for performing the steps.

What is claimed is:

1. In a computer system that implements a search engine that is accessible to a community of users, a method of assisting users in refining search queries, the method comprising:

receiving a search query submitted by a user, the search query comprising at least one term;

using a history of search queries submitted to the search engine over a selected period of time by the community of users to identify at least one refinement to the search query; and suggesting the at least one refinement to the user.

2. The method as in claim 1, wherein identifying the at least one refinement comprises using the history of search queries to identify an additional term that has appeared in combination with each term of the query submitted by the user relatively frequently over the selected period of time.

3. The method as in claim 1, wherein suggesting the at least one refinement comprises presenting a plurality of augmented search queries to the user as respective hyperlinks that are selectable by the user to initiate corresponding searches.

4. The method as in claim 1, wherein identifying the at least one refinement comprises using the history of search queries to determine that none of the at least one refinement does produces a NULL search result.

5. The method as in claim 1, wherein the period of time is selected such that recent historical search queries are given more weight than aged historical search queries, so that suggested refinements tend to reflect current interests of the community of users.

6. A system for assisting users in refining search queries submitted to a search engine, comprising:

a first program module which processes query logs of the search engine to generate correlation data that reflects frequencies of occurrences of query terms within the same query; and a second program module which uses at least the correlation data to suggest refinements to search queries received from users.

7. The system as in claim 6, wherein the first program module ignores query submissions that produced NULL search results.

8. The system as in claim 6, wherein the first program module generates the correlation data periodically from a most recent set of historical query submissions, so that refinements suggested by the second program module reflect current interests of users.

9. The system as in claim 6, wherein the second program module presents refinements to users using a user interface in which each suggested refinement is presented as a respective link that is selectable to initiate a refined search.

10. A method of facilitating refinement of search queries, comprising:

receiving a search query submitted by a user;

identifying a plurality of refined search queries, each of which comprises all terms of the query submitted by the user and an additional term; and presenting each refined search query to the user as a respective link which is selectable to perform a corresponding search;

wherein the method allows the user to select a query refinement and initiate a refined search with a single selection action.

11. The method as in claim 10, wherein identifying a plurality of refined search queries comprises using historical query data to identify refined queries that reflect current interests of users.

12. The method as in claim 10, wherein identifying a plurality of refined search queries comprises using a history of query submissions to determine that none of the refined search queries produces a NULL search result.

* * * * *